(12) United States Patent
Kim

(10) Patent No.: US 8,345,103 B2
(45) Date of Patent: Jan. 1, 2013

(54) APPARATUS AND METHOD OF OBTAINING 3D IMAGE

(75) Inventor: Seong Jin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 568 days.

(21) Appl. No.: 12/588,917

(22) Filed: Nov. 2, 2009

(65) Prior Publication Data

US 2010/0128129 A1     May 27, 2010

(30) Foreign Application Priority Data

Nov. 26, 2008    (KR) ........................ 10-2008-0118107

(51) Int. Cl.
*H04N 5/33*     (2006.01)

(52) U.S. Cl. ........................ 348/164; 348/168; 348/273

(58) Field of Classification Search .......... 348/164–168, 348/272–273, E5.09
See application file for complete search history.

(56) References Cited

U.S. PATENT DOCUMENTS

| | | | |
|---|---|---|---|
| 8,018,509 B2* | 9/2011 | Numata | 348/273 |
| 2002/0030755 A1* | 3/2002 | Uchino | 348/342 |
| 2003/0012277 A1* | 1/2003 | Azuma et al. | 375/240.08 |
| 2007/0121106 A1* | 5/2007 | Shibata et al. | 356/237.2 |
| 2007/0183657 A1* | 8/2007 | Kidono et al. | 382/162 |
| 2008/0068475 A1* | 3/2008 | Choe et al. | 348/273 |
| 2010/0102366 A1* | 4/2010 | Lee et al. | 257/291 |
| 2010/0265316 A1* | 10/2010 | Sali et al. | 348/46 |
| 2011/0169984 A1* | 7/2011 | Noguchi | 348/E05.09 |

FOREIGN PATENT DOCUMENTS

| | | |
|---|---|---|
| JP | 2003-307407 | 10/2003 |
| JP | 2007-071891 | 3/2007 |
| JP | 2008-116308 | 5/2008 |
| JP | 2008-116309 | 5/2008 |

* cited by examiner

*Primary Examiner* — Bharat N Barot
(74) *Attorney, Agent, or Firm* — Staas & Halsey LLP

(57) ABSTRACT

An apparatus and method for obtaining an image. A first filter unit of the apparatus of obtaining an image may pass a light in a first wavelength band corresponding to visible light. Also, a second filter unit may pass a light in a second wavelength band corresponding to an Infrared ray (IR). A sensor unit may sense the light in the first wavelength band and the light in the second wavelength band. An operating unit may operate at least one of the first filter unit and the second filter unit.

14 Claims, 8 Drawing Sheets

APPARATUS AND METHOD OF OBTAINING 3D IMAGE

CROSS-REFERENCE TO RELATED APPLICATIONS

This application claims the benefit of Korean Patent Application No. 10-2008-0118107, filed on Nov. 26, 2008, in the Korean Intellectual Property Office, the disclosure of which is incorporated herein by reference.

BACKGROUND

1. Field

Example embodiments relate to an apparatus and method of obtaining an image to obtain a depth image and a color image, and more particularly, to a unified sensing architecture based on time-multiplexing readout.

2. Description of the Related Art

A digital camera and a camcorder may generate an image by obtaining color information and intensity information, which is called a two-dimensional (2D) camera system. A three-dimensional (3D) camera system may generate a 3D image by obtaining color information as well as depth information. In general, a distance (hereinafter, referred to as 'depth') between a 3D camera and an object may be calculated using a Time of Flight (TOF) to obtain a depth image. The TOF may indicate an elapsed time between when an Infrared ray (IR) is emitted, then reflected, and finally sensed by a sensor. Architectures of a unified sensor, which may obtain both color information and depth information, may be divided into two types.

The two types of a unified sensor may be a unified sensing architecture based on spatial multiplexing readout, and a unified sensing architecture based on time-multiplexing readout. In a unified sensing architecture based on spatial multiplexing readout, a sensor may include a plurality of pixels which senses color information and a plurality of pixels which senses depth information. Also, the plurality of pixels sensing color information and the plurality of pixels sensing depth information may be distributed in a particular pattern within an array structure in a sensor.

In a unified sensing architecture based on time-multiplexing readout, same pixels in a sensor may sense both color information and depth information. Also, each pixel of a sensor may sequentially obtain color information and depth information.

Also, since a same pixel is required to obtain both color information and depth information in the unified sensing architecture based on time-multiplexing readmit, a filter configuration different from a filter used for a 2D camera system is required.

SUMMARY

Example embodiments may provide an apparatus and method of obtaining an image that may prevent an Infrared ray (IR) from being sensed by a sensor in a frame for obtaining color information and prevent visible light from being sensed by a sensor in a frame for obtaining depth information.

Example embodiments may also provide an apparatus and method of obtaining an image that may reduce deterioration of color and improve a quality of a depth image.

According to example embodiments, there may be an apparatus of obtaining an image, the apparatus including a first filter unit to pass a light in a first wavelength band corresponding to visible light, a second filter unit to pass a light in a second wavelength band corresponding to an IR, a sensor unit to include at least one pixel which senses the light in the first wavelength band and the light in the second wavelength band, and an operating unit to operate at least one of the first filter unit and the second filter unit to filter the light sensed by the sensor unit.

The operating unit may operate the first filter unit in a first operation mode to guide the light sensed by the sensor unit to pass through the first filter unit, and operate the second filter unit in a second operation mode to guide the light sensed by the sensor unit to pass through the second filter unit, the first operation mode being a mode for obtaining a color image, and the second operation mode being a mode for obtaining a depth image.

The first filter unit and the second filter unit may share a same rotation axis. The operating unit may rotate the first filter unit and the second filter unit on the rotation axis in a first operation mode to guide the light sensed by the sensor unit to pass through the first filter unit, and rotate the first filter unit and the second filter unit on the rotation axis in a second operation mode to guide the light sensed by the sensor unit to pass through the second filter unit, the first operation mode being a mode for obtaining a color image, and the second operation mode being a mode for obtaining a depth image.

The rotation axis may be orthogonal to a direction where the light sensed by the sensor unit is incident on the sensor unit, and rotation axis may be parallel with a direction where the light sensed by the sensor unit is incident on the sensor unit.

A first rotation axis, which is a rotation axis of the first filter unit, may be parallel with a second rotation axis which is a rotation axis of the second filter unit. Also, the operating unit may rotate the first filter unit and the second filter unit in a first operation mode to guide the light sensed by the sensor unit to pass through the first filter unit, and rotate the first filter unit and the second filter unit in a second operation mode to guide the light sensed by the sensor unit to pass through the second filter unit, the first operation mode being a mode for obtaining a color image, and the second operation mode being a mode for obtaining a depth image.

According to other example embodiments, there may be provided an apparatus of obtaining an image, the apparatus including a second filter unit to pass a light in a second wavelength band corresponding to an IR, a third filter unit to pass a light in a first wavelength band corresponding to visible light, and the light in the second wavelength band corresponding to the IR, a sensor unit to include at least one pixel which senses the light in the first wavelength band and the light in the second wavelength band, and an operating unit to operate the second filter unit to filter the light sensed by the sensor unit.

The third filter unit may be fixed to filter the light sensed by the sensor unit.

The operating unit may operate the second filter unit in a first operation mode and prevent the light sensed by the sensor unit from passing through the second filter unit, and operate the second filter unit in a second operation mode to guide the light sensed by the sensor unit to pass through the second filter unit, the first operation mode being a mode for obtaining a color image, and the second operation mode being a mode for obtaining a depth image.

According to still other example embodiments, there may be provided a method of obtaining an image, the method including operating a first filter unit which passes a light in a first wavelength band corresponding to visible light in a first operation mode for obtaining a color image to guide a light sensed by a sensor unit to pass through the first filter unit, and operating a second filter unit which passes a light in a second wavelength band corresponding to an IR in a second operation mode for obtaining a depth image to guide the light sensed by the sensor unit to pass through the second filter unit.

According to yet other example embodiments, there may be provided a method of obtaining an image, the method including removing a second filter unit which passes a light in a second wavelength band corresponding to an IR in a first operation mode for obtaining a color image to guide a light, sensed by a sensor unit, to pass through a third filter unit, the third filter unit passing the light in the second wavelength band corresponding to the IR and a light in a first wavelength band corresponding to visible light, and operating the second filter unit to be adjacent to the sensor unit in a second operation mode for obtaining a depth image to guide the light, sensed by the sensor unit, to pass through the second filter unit and the third filter unit.

Additional aspects, and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
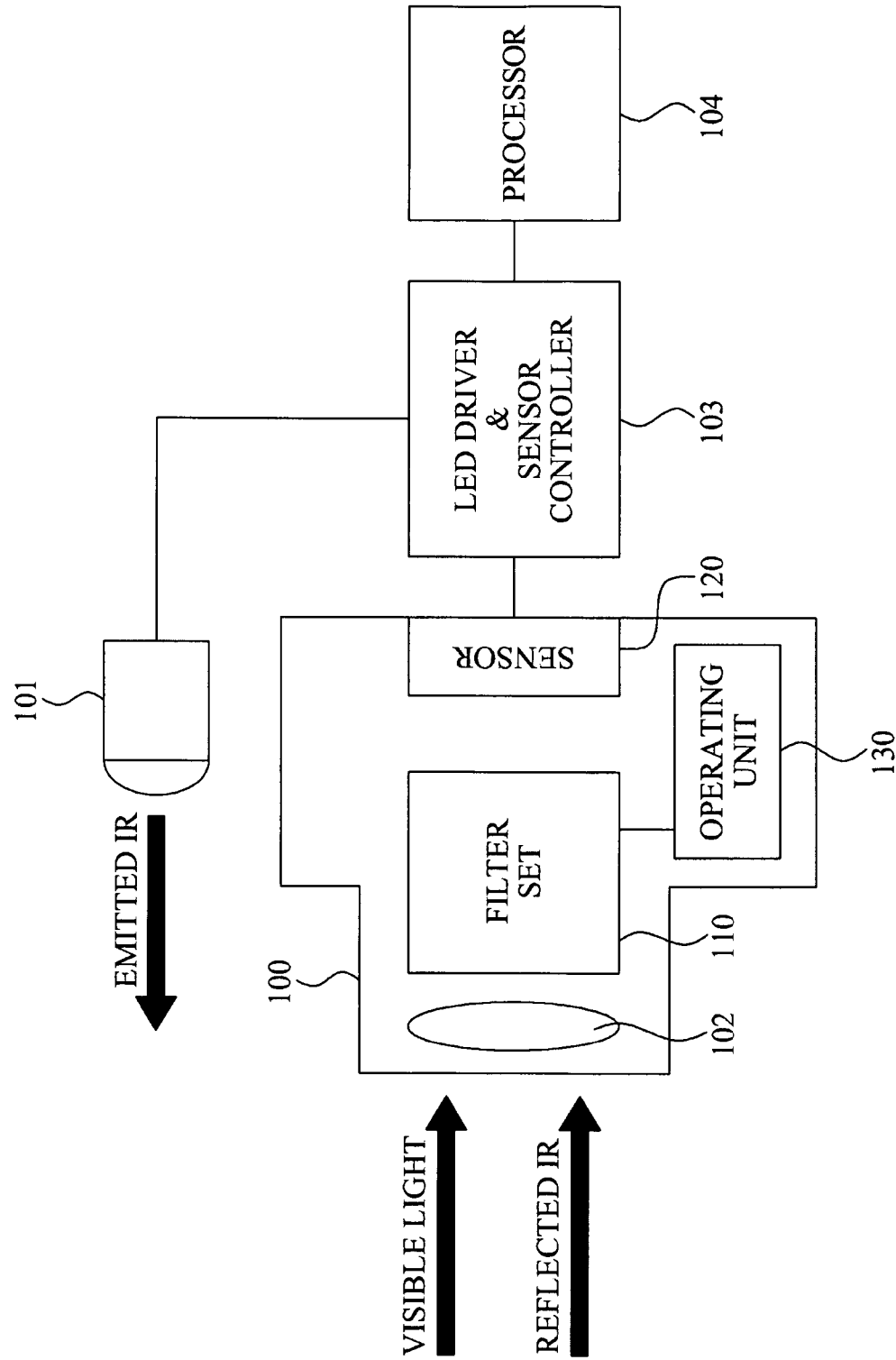
FIG. 1 illustrates a configuration of an apparatus of obtaining an image according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a configuration of an apparatus 100 of obtaining an image according to example embodiments.

The apparatus 100 of obtaining an image may receive visible light and an Infrared ray (IR) and generate a color image and a depth image.

A light emitting unit, for example, an IR Light-Emitting Diode (LED) 101 may emit an IR under control of a control module 103, that is, an LED driver and sensor controller 103. The emitted IR may be reflected by an object and be incident on the apparatus 100 of obtaining an image through a lens 102.

Also, the apparatus 100 of obtaining an image may have at least two operation modes. A first operation mode may be a mode for obtaining color information.

According to example embodiments, a filter set 110 may pass only light corresponding to visible light in the first operation mode. Accordingly, a sensor unit 120 may sense the light passing through the filter set 110 under control of the control module 103, and provide an electric signal to a processor 104. Also, the processor 104 may generate the color image using the electric signal.

The filter set 110 may pass a reflected IR which was emitted by the IR LED 101 in a second operation mode. Accordingly, the sensor unit 120 may sense the light passing through the filter set 110 under control of the control module 103 and provide an electric signal to the processor 104. Also, the processor 104 may generate the depth image using the electric signal.

The filter set 110 may be mechanically or electrically operated by an operating unit 130. A configuration and an operation of the filter set 110 are described in detail with reference to FIGS. 2 through 8.

Figure 2:
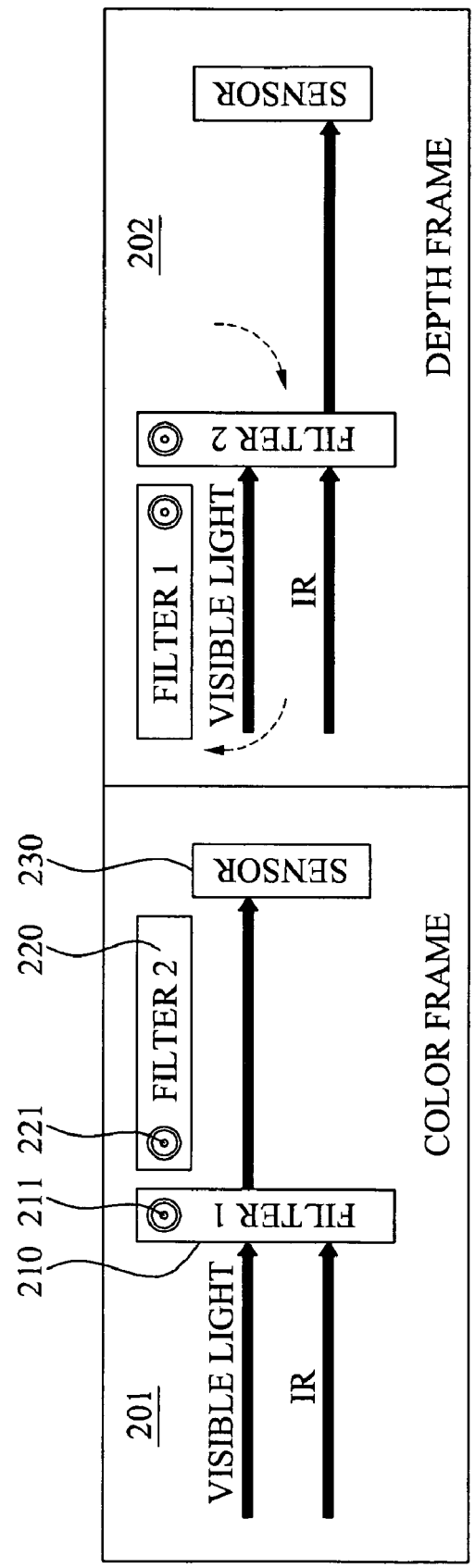
FIG. 2 illustrates a method of operating a first filter unit and a second filter unit according to example embodiments.

FIG. 2 illustrates a method of operating a first filter unit 210 and a second filter unit 220 according to example embodiments.

According to example embodiments, an operating unit 130 of FIG. 1 may operate the first filter unit (FILTER 1) 210 to guide a light, which is incident on an apparatus 100 (FIG. 1) of obtaining an image through an optical lens 102 (FIG. 1), to pass through the first filter unit 210 in a first operation mode 201. The first operation mode 201 may be a frame for obtaining a color image.

In this instance, the second filter (FILTER 2) 220 may not be operated.

The first filter unit 210 may pass a light in a wavelength band corresponding to visible light. For example, the first filter unit 210 may pass a light with a wavelength in a range of 400 nm to 700 nm, and block light with other wavelengths. However, the wavelength may vary and the apparatus 100 (FIG. 1) of obtaining an image may not be limited to the above-described example.

The light incident through the optical lens 102 (FIG. 1) may have a spectrum with various wavelengths, and only light corresponding to the visible light may reach a sensor unit 230 by passing through the first filter unit 210. Accordingly, a light sensed by the sensor unit 230 in the first operation mode 201 may be the visible light.

Also, the apparatus 100 (FIG. 1) of obtaining an image may be switched from the first operation mode 201 to a second operation mode 202 within a predetermined time, for example, a fifth of a second, a hundredth of a second, or five-hundredths of a second.

In this instance, the operating unit 130 (FIG. 1) may rotate the first filter unit 210 on a rotation axis 211 of the first filter unit 210, and prevent the light incident through the optical lens 102 (FIG. 1) from passing through the first filter unit 210.

The operating unit 130 (FIG. 1) may operate the second filter unit 220 to guide a light, which is incident on the apparatus 100 (FIG. 1) of obtaining an image through the optical lens 102 (FIG. 1), to pass through the second filter unit 220 in a second operation mode 202. The second operation mode 202 may be a frame for obtaining a depth image. The second filter unit 220 may be rotated on a rotation axis 221 of the second filter unit 220.

The second filter unit 220 may pass a light in a wavelength band corresponding to an IR of a particular band. For example, when an IR emitted by a light emitting unit 101 of FIG. 1 has a wavelength in a range of 800 nm to 900 nm, the second filter unit 220 may pass a light with the wavelength in a range of 800 nm to 900 nm, and block light with other wavelengths. However, the wavelength may vary and the apparatus 100 (FIG. 1) of obtaining an image may not be limited to the above-described example.

The light incident through the optical lens 102 (FIG. 1) may have a spectrum with various wavelengths, and only an IR corresponding to the predetermined band may reach the sensor unit 230 by passing through the second filter unit 220. Accordingly, a light sensed by the sensor unit 230 in the second operation mode 202 may be an IR.

Therefore, color deterioration due to an IR may be prevented in the first operation mode for obtaining the color image, and a degradation of depth accuracy due to visible light may be prevented in the second operation mode for obtaining the depth image.

Figure 3:
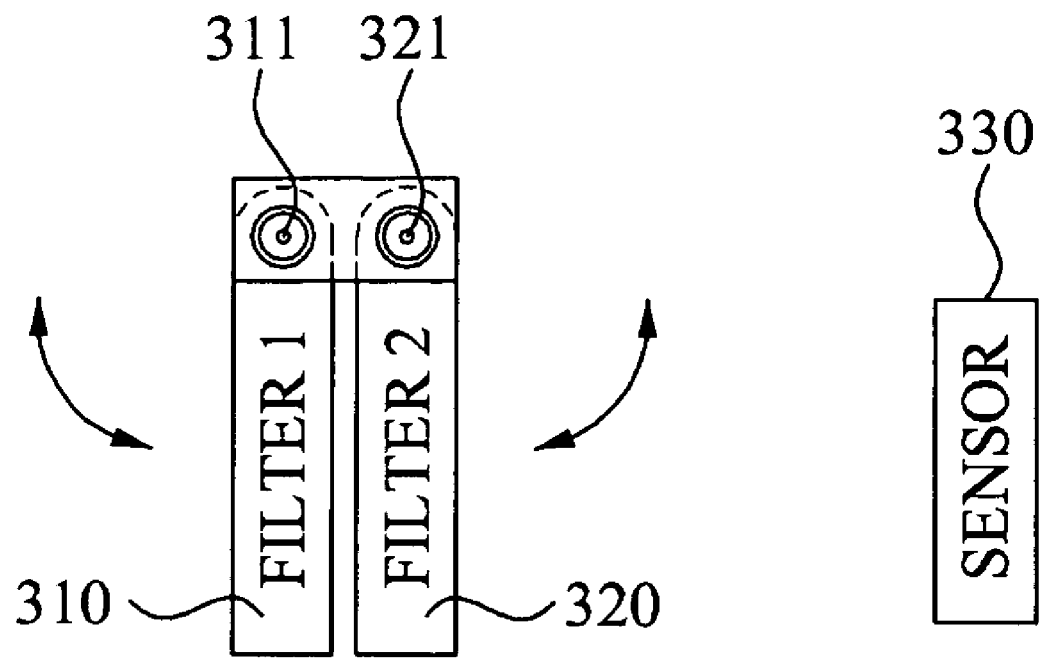
FIG. 3 illustrates a side view of a first filter unit and a second filter unit in an apparatus of obtaining an image according to example embodiments.

FIG. 3 illustrates a side view of a first filter unit 310 and a second filter unit 320 in an apparatus of obtaining an image according to example embodiments.

According to example embodiments, a rotation axis 311 of the first filter unit (FILTER 1) 310 may be parallel with a rotation axis 321 of the second filter unit (FILTER 2) 320. The first filter unit 310 may pass a light in a wavelength band corresponding to visible light, and the second filter unit 320 may pass a light in a wavelength band corresponding to IR.

The first filter unit 310 may be operated by an operating unit 130 (FIG. 1) in a first operation mode for obtaining a color image. In this instance, the second filter unit 320 may not be operated. A light incident through an optical lens 102 (FIG. 1) may be controlled to pass through only the first filter unit 310 as opposed to the second filter unit 320 in the first operation mode.

Also, the second filter unit 320 may be operated by the operating unit 130 (FIG. 1) in a second operation mode for obtaining a depth image. In this instance, the second filter unit 320, which is not operated in the first operation mode, may be rotated by the operating unit 130 (FIG. 1) on the rotation axis 321 in a clockwise direction. Also, the first filter unit 310 may be rotated on the rotation axis 311 in a clockwise direction, and thereby be removed. Accordingly, the first filter unit 310 may not pass a light in the second operation mode. Also, the light incident through the optical lens 102 (FIG. 1) may be controlled to pass through only the second filter unit 320 as opposed to the first filter unit 310 in the second operation mode.

Accordingly, the light which is sensed by a sensor unit 330 during the first operation mode may be visible light which is used to generate the color image. Also, the light which is sensed by the sensor unit 330 during the second operation mode may be the emitted IR which is used to generate the depth image.

Figure 4:
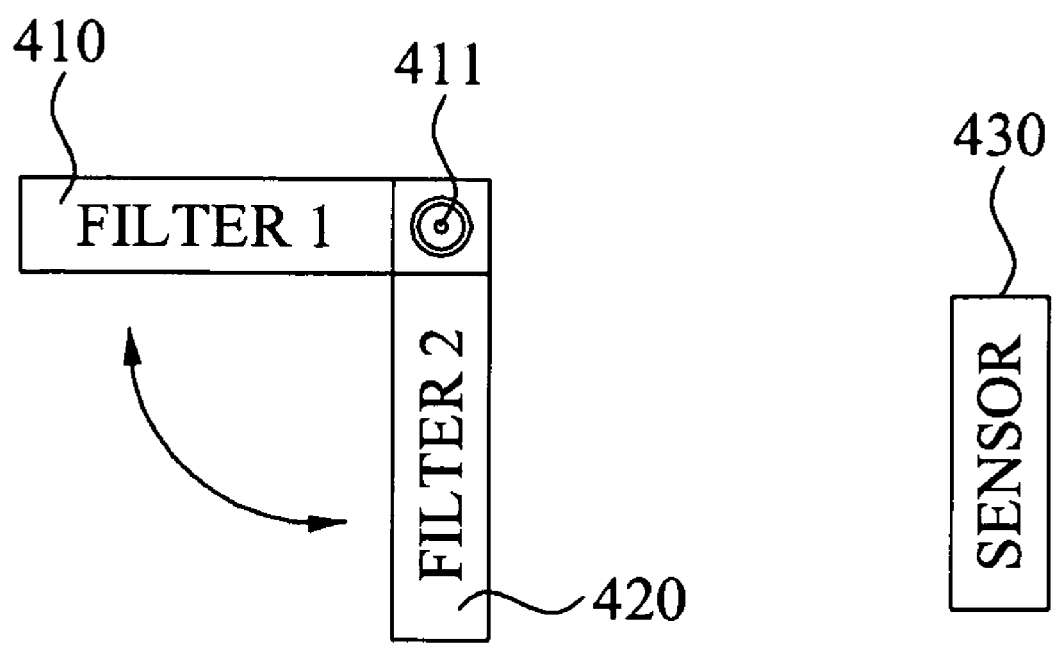
FIG. 4 illustrates a side view of a first filter unit and a second filter unit in an apparatus of obtaining an image according to other example embodiments.

FIG. 4 illustrates a side view of a first filter unit 410 and a second filter unit 420 in an apparatus of obtaining an image according to other example embodiments.

According to other example embodiments, the first filter unit (FILTER 1) 410 and the second filter unit (FILTER 2) 420 may share a same rotation axis 411. Also, an angle between the first filter unit 410 and the second filter unit 420 may be fixed. For example, the angle between the first filter unit 410 and the second filter unit 420 may be 90 degrees.

In this instance, although the first filter unit 410 and the second filter unit 420 may not move freely, a configuration may be simple since the first filter unit 410 and the second filter unit 420 may have the same rotation axis 411. Also, power to operate the first filter unit 410 and the second filter unit 420 may be reduced.

The first filter unit 410 may be parallel with a sensor unit 430 in a first operation mode. When the apparatus 100 (FIG. 1) of obtaining an image is switched from the first operation mode to a second operation mode, the first filter unit 410 and the second filter unit 420 may rotate by 90 degrees in a clockwise direction. In this instance, the second filter unit 420 may be parallel with the sensor unit 430.

Filtering by each of the first filter unit 410 and the second filter unit 420 may be performed in a same way as the filtering described with reference to FIG. 2.

Figure 5:
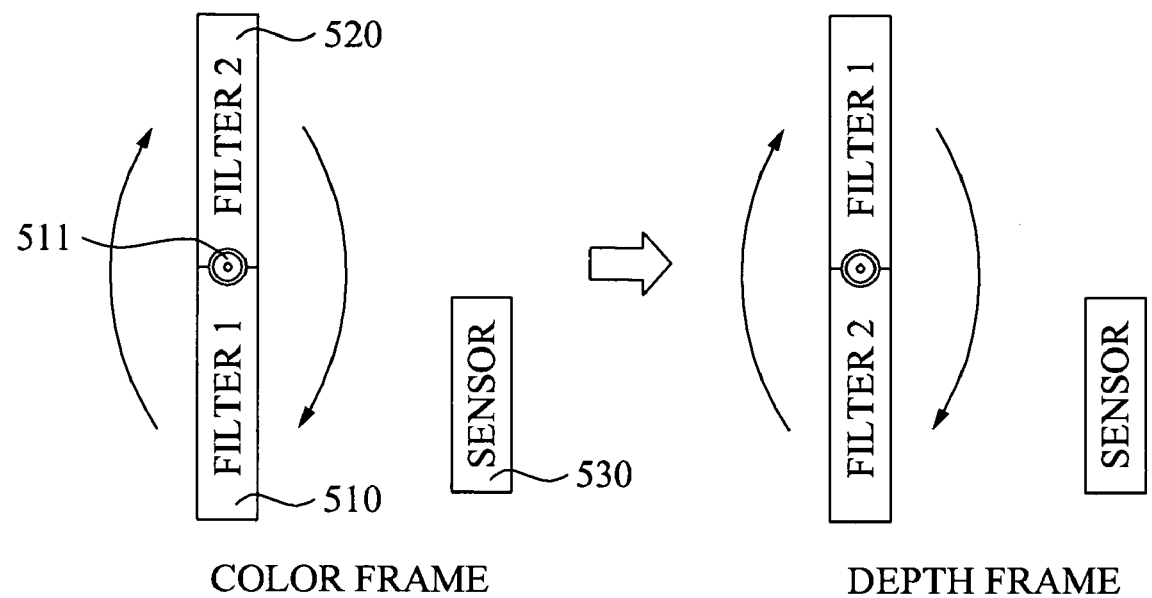
FIG. 5 illustrates a side view of a first filter unit and a second filter unit in an apparatus of obtaining an image according to still other example embodiments.

FIG. 5 illustrates a side view of a first filter unit 510 and a second filter unit 520 in an apparatus of obtaining an image according to still other example embodiments.

According to still other example embodiments, the first filter unit (FILTER 1) 510 and the second filter unit (FILTER 2) 520 may share a same rotation axis 511. Also, an angle between the first filter unit 510 and the second filter unit 520 may be fixed. The angle may be 180 degrees as opposed to the example of FIG. 4.

The first filter unit 510 may be parallel with a sensor unit 530. The first filter unit 510 may pass visible light in a first operation mode for obtaining a color image. When the apparatus 100 (FIG. 1) of obtaining an image is switched from the first operation mode to a second operation mode, the first filter unit 510 and the second filter unit 520 may rotate by 180 degrees in a clockwise or anti-clockwise direction. Accordingly, the second filter unit 520 passing IR may be parallel with the sensor unit 530.

Although it has been described above that the angle is 90 degrees or 180 degrees as an example, the apparatus 100 (FIG. 1) of obtaining an image may not be limited to the above-described examples. It will be apparent to those skilled in the related art that the angle, a location of the rotation axis, etc. may vary depending on a mechanical design.

Figure 6:
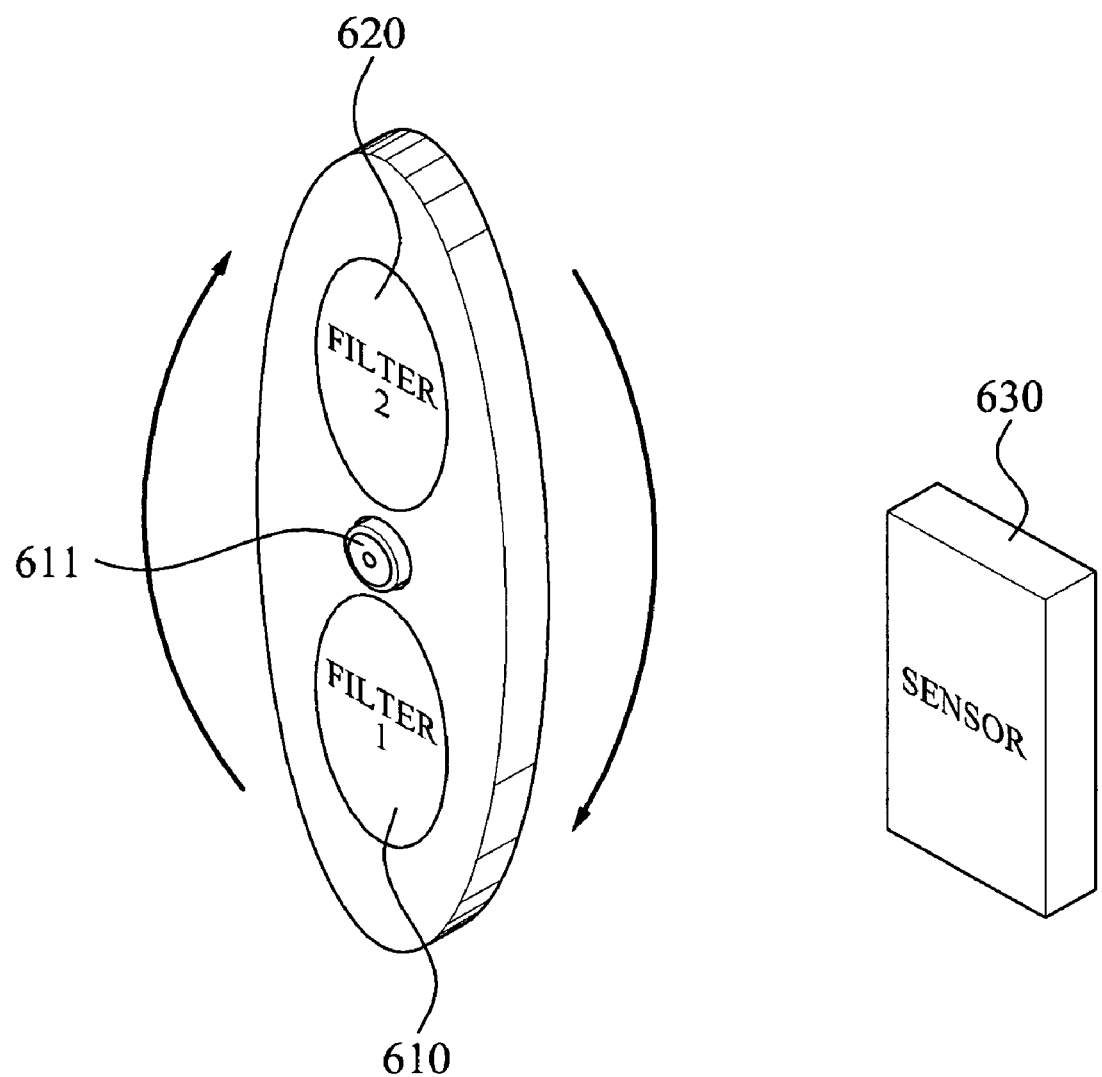
FIG. 6 illustrates a first filter unit and a second filter unit in an apparatus of obtaining an image according to yet other example embodiments.

FIG. 6 illustrates a first filter unit 610 and a second filter unit 620 in an apparatus of obtaining an image according to yet other example embodiments.

A direction of the rotation axis 411 or the rotation axis 511 may be parallel with a direction of a surface of the sensor unit 430 or the sensor unit 530 in FIG. 4 and FIG. 5. However, a direction of the first filter unit (FILTER 1) 610 may be orthogonal to a direction of a surface of a sensor unit 630 according to yet other example embodiments.

The first filter unit 610 and the second filter unit (FILTER 2) 620 may be rotated by an operating unit 130 (FIG. 1) around the rotation axis 611. The first filter unit 610 may be controlled to be located in front of the sensor unit 630 in a first operation mode for obtaining a color image. In this instance, the first filter unit 610 may pass a light in a wavelength band corresponding to visible light. Also, the second filter unit 620 may be controlled to be located in front of the sensor unit 630 in a second operation mode for obtaining a depth image. The second filter unit 620 may pass an IR.

However, changes with respect to a configuration of the first filter unit 610 and the second filter unit 620 illustrated in FIG. 6 may be made without departing from the principles and spirit of the disclosure. Also, the apparatus 100 (FIG. 1) of obtaining an image may not be limited to the above-described examples.

Figure 7:
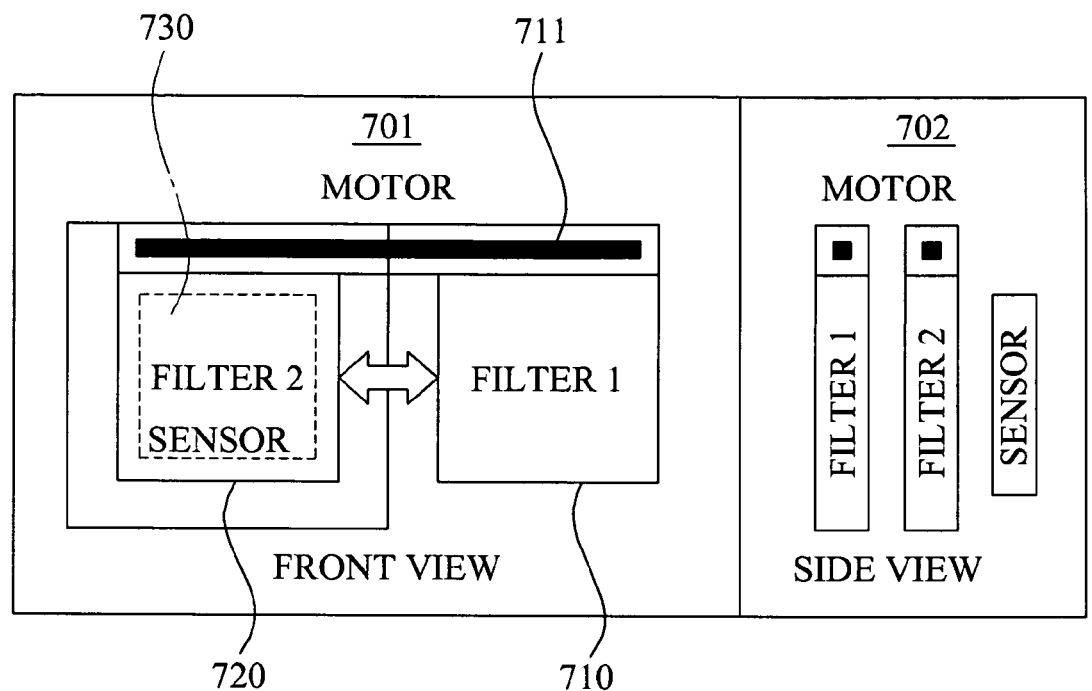
FIG. 7 illustrates a side view and a front view of a first filter unit and a second filter unit in an apparatus of obtaining an image according to further embodiments.

FIG. 7 illustrates a front view 701 and a side view 702 of a first filter unit 710 and a second filter unit 720 in an apparatus of obtaining an image according to further embodiments.

According to further embodiments, the first filter unit (FILTER 1) 710 and the second filter unit (FILTER 2) 720 may move through rail 711. The first filter unit 710 may pass visible light and the second filter unit 720 may pass an IR.

Referring to the front view 701, the second filter unit 720 may move in front of a sensor unit 730 (as indicated by a dashed outline) in a second operation mode for obtaining a depth image. Also, the first filter unit 710 may move outside of a sensing area in the second operation mode. A location of the first filter unit 710 and the second filter unit 720 may change in a first operation mode for obtaining a color image.

In this instance, an operating unit 130 (FIG. 1) may change the location of the first filter unit 710 and the second filter unit 720 on the rail 711 using a motor.

Figure 8:
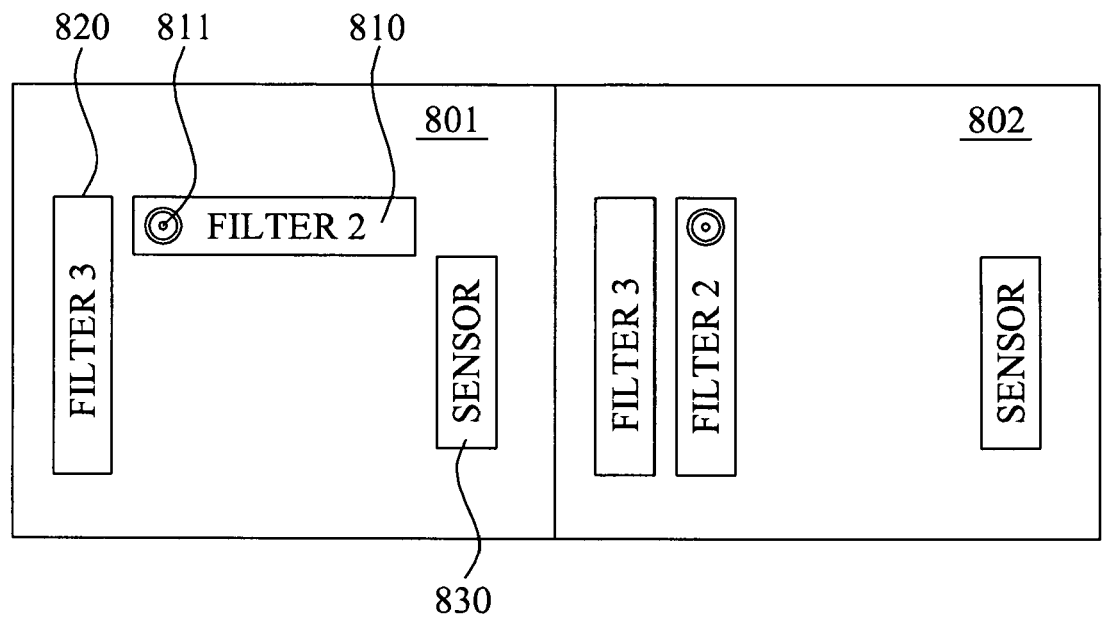
FIG. 8 illustrates a second filter unit and a third filter unit in an apparatus of obtaining an image according to other embodiments.

FIG. 8 illustrates a second filter unit 810 and a third filter unit 820 in an apparatus of obtaining an image according to other embodiments.

The third filter unit (FILTER 3) 820 may pass a light in a wavelength band corresponding to visible light (for example, 400 nm to 700 nm) as well as a light in a wavelength band corresponding to IR (for example, 800 nm to 900 nm), and block light in other wavelength bands. Also, the third filter 820 unit may be a film coated on the sensor unit.

The third filter unit 820 may be fixed between a sensor unit 830 and a lens 102 of FIG. 1. In this instance, only light with a wavelength in a range of 400 nm to 700 nm and light with a wavelength in a range of 800 nm to 900 nm may pass through the third filter unit 820 from among light which is incident on the apparatus 100 (FIG. 1) of obtaining an image through the lens 102 (FIG. 1).

The second filter unit (FILTER 2) 810 passing only an IR, that is, the light in the wavelength band in a range of 800 nm to 900 nm, may not be operated in a first operation mode 801 for obtaining a color image. Accordingly, the light passing through the third filter unit 820 may be sensed by the sensor unit 830. Also, the color image may be generated based on a quantity of an electric charge emitted when each pixel, for example, a photo diode, of the sensor unit 830 senses the light.

Also, the second filter unit 810 may rotate on a rotation axis 811, and thereby may be located between the third filter unit 820 and the sensor unit 830 in a second operation mode 802 for obtaining a depth image.

In this instance, when the light passing through the third filter unit 820 may pass through the second filter unit 810, and only an IR in the wavelength band in a range of 800 nm to 900 nm may be sensed by the sensor unit 830.

In this instance, the depth image may be generated based on a quantity of an electric charge emitted when each pixel of the sensor unit 830 senses the IR.

Also, a near IR excluding an emitted IR may be prevented from being sensed by each of the pixels of the sensor unit 830.

For example, it may be assumed that a wavelength of the emitted IR, emitted by a light emitting unit 101 of FIG. 1, is in a range of 800 nm to 900 nm. In this instance, although an IR with a wavelength outside the range of 800 nm to 900 nm is incident on the apparatus 100 of obtaining an image, the incident light may not be a light of the emitted light being reflected from an object. In general, an IR with a wavelength different from the wavelength band of the emitted IR may be radiated by an object.

When a portion of photo diodes included in the pixels of the sensor unit 830 is exposed to an undesired IR in the first operation mode and the second operation mode, saturation may occur. Accordingly, a shot noise may occur, which may adversely affect the obtaining of the depth image in the second operation mode. Thus, an accuracy of the depth image may be degraded.

However, in FIG. 8, an IR with a wavelength outside the range of 800 nm to 900 nm, the wavelength band of the emitted IR (that is, an undesired IR) may be cut by the fixed third filter unit 820. Accordingly, the saturation may be prevented and the accuracy of the depth image may be improved.

The method of obtaining an image according to the above-described example embodiments may be recorded in computer-readable media including program instructions to implement various operations embodied by a computer or processing device. The media may also include, alone or in combination with the program instructions, data files, data structures, etc. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus of obtaining an image, the apparatus comprising:
    a first filter unit to pass a light in a first wavelength band corresponding to visible light;
    a second filter unit to pass a light in a second wavelength band corresponding to an Infrared ray (IR);
    a sensor unit to include at least one pixel which senses the light in the first wavelength band and the light in the second wavelength band; and
    an operating unit to operate at least one of the first filter unit and the second filter unit to filter the light sensed by the sensor unit, wherein
    the first filter is configured to rotate on a first rotation axis orthogonal to a direction where the light sensed by the sensor unit is incident on the sensor unit, and
    the second filter is configured to rotate on a second rotation axis orthogonal to a direction where the light sensed by the sensor unit is incident on the sensor unit.

2. The apparatus of claim 1, wherein the operating unit operates the first filter unit in a first operation mode to guide the light sensed by the sensor unit to pass through the first filter unit, and operates the second filter unit in a second operation mode to guide the light sensed by the sensor unit to pass through the second filter unit, the first operation mode being a mode for obtaining a color image, and the second operation mode being a mode for obtaining a depth image.

3. The apparatus of claim 1, wherein the first filter unit and the second filter unit share a same rotation axis, the operating unit rotates the first filter unit and the second filter unit on the rotation axis in a first operation mode to guide the light sensed by the sensor unit to pass through the first filter unit, and rotates the first filter unit and the second filter unit on the rotation axis in a second operation mode to guide the light sensed by the sensor unit to pass through the second filter unit, the first operation mode being a mode for obtaining a color image, and the second operation mode being a mode for obtaining a depth image.

4. The apparatus of claim 1, wherein the first rotation axis is parallel with the second rotation axis, and the operating unit rotates the first filter unit and the second filter unit in a first operation mode to guide the light sensed by the sensor unit to pass through the first filter unit, and rotates the first filter unit and the second filter unit in a second operation mode to guide the light sensed by the sensor unit to pass through the second filter unit, the first operation mode being a mode for obtaining a color image, and the second operation mode being a mode for obtaining a depth image.

5. An apparatus of obtaining an image, the apparatus comprising:
- a second filter unit to pass a light in a second wavelength band corresponding to an IR;
- a third filter unit to pass a light in a first wavelength band corresponding to visible light, and the light in the second wavelength band corresponding to the IR;
- a sensor unit to include at least one pixel which senses the light in the first wavelength band and the light in the second wavelength band; and
- an operating unit to operate the second filter unit to filter the light sensed by the sensor unit, wherein
- the second filter is configured to rotate on a second rotation axis orthogonal to a direction where the light sensed by the sensor unit is incident on the sensor unit.

6. The apparatus of claim 5, wherein the third filter unit is fixed to filter the light sensed by the sensor unit.

7. The apparatus of claim 5, wherein the third filter unit is a film coated on the sensor unit.

8. The apparatus of claim 5, wherein the operating unit operates the second filter unit in a first operation mode to prevent the light sensed by the sensor unit from passing through the second filter unit, and operates the second filter unit in a second operation mode to guide the light sensed by the sensor unit to pass through the second filter unit, the first operation mode being a mode for obtaining a color image, and the second operation mode being a mode for obtaining a depth image.

9. A method of obtaining an image, the method comprising:
- operating a first filter unit, which passes a light in a first wavelength band corresponding to visible light in a first operation mode for obtaining a color image, to guide a light sensed by a sensor unit to pass through the first filter unit; and
- operating a second filter unit, which passes a light in a second wavelength band corresponding to an IR in a second operation mode for obtaining a depth image, to guide the light sensed by the sensor unit to pass through the second filter unit, wherein
- the first filter is configured to rotate on a first rotation axis orthogonal to a direction where the light sensed by the sensor unit is incident on the sensor unit, and
- the second filter is configured to rotate on a second rotation axis orthogonal to a direction where the light sensed by the sensor unit is incident on the sensor unit.

10. The method of claim 9, wherein the first filter unit and the second filter unit share a same rotation axis,
- the operating of the first filter unit rotates the first filter unit and the second filter unit on the rotation axis and controls the first filter unit to be adjacent to the sensor unit, and
- the operating of the second filter unit rotates the first filter unit and the second filter unit on the rotation axis and controls the second filter unit to be adjacent to the sensor unit.

11. The method of claim 9, wherein the operating of the first filter unit rotates the first filter unit on a first rotation axis and controls the first filter unit to be adjacent to the sensor unit, and
- the operating of the second filter unit rotates the second filter unit on a second rotation axis and controls the second filter unit to be adjacent to the sensor unit,
- the first rotation axis being a rotation axis of the first filter unit, the second rotation axis being a rotation axis of the second filter unit.

12. A method of obtaining an image, the method comprising:
- removing a second filter unit, which passes a light in a second wavelength band corresponding to an IR in a first operation mode for obtaining a color image, to guide a light sensed by a sensor unit to pass through a third filter unit, the third filter unit passing the light in the second wavelength band corresponding to the IR and a light in a first wavelength band corresponding to visible light; and
- operating the second filter unit to be adjacent to the sensor unit in a second operation mode for obtaining a depth image to guide the light sensed by the sensor unit to pass through the second filter unit and the third filter unit, wherein
- the second filter is configured to rotate on a second rotation axis orthogonal to a direction where the light sensed by the sensor unit is incident on the sensor unit.

13. A non-transitory computer-readable recording medium storing a program for implementing a method of obtaining an image, the method comprising:
- operating a first filter unit, which passes a light in a first wavelength band corresponding to visible light in a first operation mode for obtaining a color image to guide a light sensed by a sensor unit to pass through the first filter unit; and
- operating a second filter unit, which passes a light in a second wavelength band corresponding to an IR in a second operation mode for obtaining a depth image to guide the light sensed by the sensor unit to pass through the second filter unit, wherein
- the first filter is configured to rotate on a first rotation axis orthogonal to a direction where the light sensed by the sensor unit is incident on the sensor unit, and
- the second filter is configured to rotate on a second rotation axis orthogonal to a direction where the light sensed by the sensor unit is incident on the sensor unit.

14. A non-transitory computer-readable recording medium storing a program for implementing a method of obtaining an image, the method comprising:
- removing a second filter unit, which passes a light in a second wavelength band corresponding to an IR in a first operation mode for obtaining a color image, to guide a light sensed by a sensor unit to pass through a third filter unit, the third filter unit passing the light in the second wavelength band corresponding to the IR and a light in a first wavelength band corresponding to visible light; and
- operating the second filter unit to be adjacent to the sensor unit in a second operation mode for obtaining a depth image to guide the light sensed by the sensor unit to pass through the second filter unit and the third filter unit, wherein
- the second filter is configured to rotate on a second rotation axis orthogonal to a direction where the light sensed by the sensor unit is incident on the sensor unit.

* * * * *

UNITED STATES PATENT AND TRADEMARK OFFICE
CERTIFICATE OF CORRECTION

PATENT NO. : 8,345,103 B2
APPLICATION NO. : 12/588917
DATED : January 1, 2013
INVENTOR(S) : Seong Jin Kim It is certified that error appears in the above-identified patent and that said Letters Patent is hereby corrected as shown below:

In the Claims:

Column 9, Line 28 (Approx.); In Claim 7, delete "claim 5," and insert -- claim 6, --, therefor.

Signed and Sealed this
Seventh Day of May, 2013

Teresa Stanek Rea
*Acting Director of the United States Patent and Trademark Office*